Oct. 20, 1953 F. PASSERI 2,656,261
ACETYLENE GAS GENERATOR WITH CONSTANT PRESSURE
Filed March 6, 1950
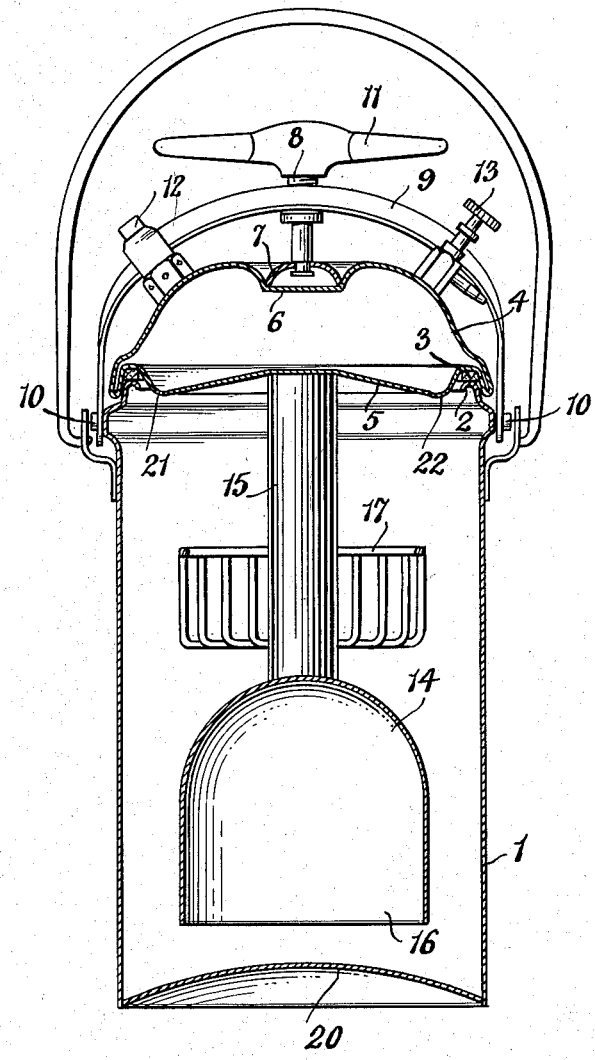
INVENTOR.
Francesco Passeri
BY
his attorney Patented Oct. 20, 1953

2,656,261

UNITED STATES PATENT OFFICE 2,656,261

ACETYLENE GAS GENERATOR WITH CONSTANT PRESSURE

Francesco Passeri, Buenos Aires, Argentina

Application March 6, 1950, Serial No. 147,786

7 Claims. (Cl. 48—22)

The invention relates to an acetylene gas generator with constant pressure and which is based upon a certain mechanical combination of elements which enable getting a high production output of acetylene gas which is generated and distributed at a constant pressure. The apparatus is furthermore of extraordinary safety in operation, due to a simple and novel construction which permits omitting the usual pressure gauge.

For better comprehension of the invention and the practical execution thereof drawings are added which show a preferred type of execution and wherein the shown figure represents a vertical sectional view through the generator in question.

The generator comprises the following elements: a cylindrical container 1 of strengthened sheet iron which has at the bottom thereof a convexity 20 towards inside and at the upper part an edge 2 upon which a flexible packing 3 is fitted. A cover 4 has the shape shown in the drawing; the bottom 5 thereof is provided with a groove able to contain packing 3. Several orifices are provided in the bottom of cover 4 as shown at 21 and 22. The upper part of the cover is provided with a cavity 6 wherein fits a clamping element 7 which is united to screw 8. An airtight closure of cover 4 upon container 1 is obtained by turning screw 8 which screws into a yoke 9 which by means of pins 10 is secured to container 1. The turning operation is made easy by wings 11. Cover 4 thus compresses the elastic packing 3 and guarantees airtightness.

Cover 4 furthermore will be provided with a safety valve 12 and a discharge cock 13.

To the bottom of cover 4 a cup-shaped casing 14 will be fixed so as to form an integral part therewith. It will serve as a counter-pressure chamber. Said casing 14 is maintained rigidly by element 15. Bottom 16 of casing 14 is open.

Upon casing 14 a basket 17 is provided which will contain calcium carbide.

Operation of the apparatus is as follows:

After filling container 1 about half with water and after putting the necessary charge of calcium carbide into basket 17, cover 4 is put upon container 1 and closed by screwing down screw 8.

The calcium carbide which contacts with water will develop acetylene which accumulates at the upper part of container 1 and in cover 4 by passing through the orifices shown in the drawing at 21 and 22. While the pressure of the water contained in container 1 will increase, the level thereof will descend, as the water will pass into the interior of casing 14, compressing the air contained therein and creating thus a counter-pressure.

In the meantime the level of the water in container 1 will continue falling and at a given moment contact with the calcium carbide will cease, terminating thus the generation of acetylene.

When acetylene is drawn off through cock 13, then the acetylene gas pressure within container 1 will diminish and the counter-pressure within casing 14 will act and try to form again an equilibrium, expelling therefrom the water which entered and increasing thus the level of the water in container 1 which again will form contact with the calcium carbide contained in basket 17. The higher the delivery of acetylene through cock 13 the higher will be the water level in container 1 and therefore the contact of the water with the calcium carbide, determining thus a constant pressure until total consumption of the calcium carbide contained in basket 17.

Having described one embodiment of the invention, it is obvious that the same is not to be restricted thereto, but is broad enough to cover all structures coming within the scope of the annexed claims.

I claim:

1. An acetylene generator comprising, an outer casing, a cover mounted on said casing, said cover comprising spaced upper and lower surfaces forming a chamber between them, a vertical post depending from the lower surface of said cover, an inner casing having a closed top and side walls and a completely open bottom mounted on the lower end of said post, a carbide basket mounted on the post above the inner casing, the lower surface of the cover having holes adapted to permit the passage of gas therethrough, a gas outlet cock and a relief valve mounted on the upper surface of the cover, a yoke attached to the outer casing, a screw cooperating with said yoke to hold the cover in pressure-tight engagement with said outer casing, and a recess in the upper surface of the cover adapted to receive the stem of said screw.

2. An acetylene generator comprising, an outer gas-containing chamber, a cover closing said chamber, means for holding said cover in closed position on said chamber, said cover having a hollow interior and having openings establishing communication between said hollow interior and the interior of the outer chamber, means on the cover for supporting a cup-shaped casing within the outer chamber, said casing having an open bottom, a carbide receptacle supported within the outer chamber between the casing and the cover, and a gas outlet cock and a relief valve in the cover in communication with the hollow interior of the same.

3. An acetylene generator comprising, an outer casing, a cover mounted on said casing, means for holding said cover in closed position on said casing, said cover being hollow and being provided with openings establishing communication between the interior of the outer casing and the hollow interior of the cover, a post extending vertically downward within the outer casing from the lower portion of the cover, a cup-shaped inner casing having an open bottom facing the lower end of the outer casing supported on the post within the outer casing, a carbide basket mounted on the post above the inner casing and below the bottom of the cover, and a gas outlet cock and relief valve mounted in the top portion of the cover and in communication with the hollow interior of the same.

4. An acetylene generator comprising, an outer casing closed at the top by a hollow cover, the bottom of said cover having openings establishing communication between the interior of the outer casing and the interior of the cover, the top of the cover being provided with a gas outlet cock and a relief valve, an inner casing closed at the top and open at the bottom arranged within the outer casing below the cover thereof, and a carbide basket mounted in the outer casing above the inner casing and below the bottom of the cover.

5. An acetylene generator as provided for in claim 4, including a yoke-shaped member fitted across the top of the cover on the outside of the same, and screw means threadable through said yoke-shaped member and operative against the top of the cover to thereby hold the cover seated in closed position on the top of the outer casing.

6. An acetylene generator comprising, an outer casing, a cover mounted at the top of said casing, said cover comprising spaced upper and lower surfaces forming a chamber between them, a vertical post depending from the lower surface of the cover and extending downwardly within the outer casing, an inner casing having a closed top and side walls and a completely open bottom mounted on the lower end of the post and having its open bottom located adjacent to the bottom of the outer casing, a carbide basket mounted on the post above the top of the inner casing and below the lower surface of the cover, the lower surface of the cover having a plurality of small holes adapted to permit the passage of gas therethrough to reach the interior of the cover, a gas outlet cock and a relief valve mounted on the upper surface of the cover and being in communication with the interior of the cover, a yoke attached to the outer casing and disposed across the top of the cover, a screw cooperating with said yoke to hold the cover in pressure-tight engagement with said outer casing, and a recess in the upper surface of the cover adapted to receive the stem of said screw.

7. An acetylene generator comprising, an outer casing provided with an open top, a cover fitted on said top and closing the same, said cover comprising spaced upper and lower surfaces forming a chamber between them, a vertical post attached to the lower surface of the cover and extending downwardly therefrom and within and centrally of the outer casing, an inner casing in the form of an open-bottom cup attached at its top to the lower portion of the post, said inner casing having its open bottom facing the bottom of the outer casing, a carbide basket attached centrally on the post above the inner casing, the lower surface of the cover being provided with holes to permit the passage of gas from the interior of the outer casing to the interior of said cover, a gas outlet cock and a relief valve mounted in the upper surface of the cover, and means operative on top of the cover for urging the same into seated and closed position on the top of the outer casing.

FRANCESCO PASSERI.

References Cited in the file of this patent

FOREIGN PATENTS

| Number | Country | Date |
|--------|---------|------|
| 252,089 | Italy | Feb. 21, 1947 |
| 538,516 | Great Britain | Aug. 7, 1941 |